July 14, 1970   A. OBERLE   3,520,318
CONTROLLER WITH ASYMMETRICAL FEEDBACK TIME CONSTANT
Filed Dec. 19, 1966

INVENTOR
Artur Oberle
BY Pierce, Scheffler & Parker
ATTORNEYS

United States Patent Office 3,520,318
Patented July 14, 1970

3,520,318
CONTROLLER WITH ASYMMETRICAL
FEEDBACK TIME CONSTANT
Artur Oberle, Ennetbaden, Switzerland, assignor to
Aktiengesellschaft Brown, Boveri & Cie, Baden,
Switzerland, a joint-stock company
Filed Dec. 19, 1966, Ser. No. 603,025
Claims priority, application Switzerland, Dec. 22, 1965,
17,683/65
Int. Cl. F15b 5/00; G05d 16/00
U.S. Cl. 137—86                                4 Claims

ABSTRACT OF THE DISCLOSURE

A process controller of the type having feedback for obtaining proportional, rate and reset control functions. The reset control feedback circuit includes a bypass effective only in one direction so as to produce an asymmetrical characteristic for the reset time constant for opposite senses of variation in the output signal.

---

This invention relates to the general art of controllers having proportional, reset and rate action for industrial regulator applications. Controllers of this general type are described, for example, in published literature such as the book by Werner G. Holzbock entitled "Instruments for Measurement and Control" published by Reinhold Publishing Corporation, New York. These controllers are also known as "PID" controllers because of their combined proportional, integral and difference actions.

Controllers operating on this principle can be of the electric or pneumatic or hydraulic type and it is the general object of the invention to provide an improvement thereon wherein the feedback component of the overall controller mechanism is given an asymmetrical characteristic. That is, the feedback means provided to obtain the desired proportional, reset and rate action comprises means for setting the feedback time constant, i.e. the reset time, together with means for by-passing the time constant setting means in one sense of action of the controller output to effect thereby an asymmetrical character of time constant for the opposite directions of action of the controller output.

The invention will be described in its application to a controller for anti-pumping regulation on turbo-compressors but it is to be understood that the principles of the invention may be applied equally as well to other industrial uses and may be incorporated in controllers operating on electric, pneumatic, or hydraulic principles.

It is known to provide turbo-compressors with anti-pumping controllers which open one or more blow-off valves as soon as the operating point of the compressor is in the immediate vicinity of the pumping limit. In this connection, use is preferably made of controllers without any permanent offset from set point, i.e. controllers with proportional and reset and rate actions. However, these controllers exhibit some disadvantages in their usual embodiment.

If the operating point of the compressor changes rapidly in the direction of smaller delivered quantities, the full proportional band, which is necessarily set for reasons of stability, must be run through in the case of the proportional and reset action controller in order fully to open the blow-off valve. The operating point will then shift into the unstable region and the compressior will start to pump—to the extent that the blow-off line, i.e. the required value of the anti-pumping regulator, is located as near as possible to the pumping limit.

Once the compressor starts to pump, experience shows that it is difficult to bring it back out of the pumping region by means of a controller which integrates the offset from set point.

Some success can be attained in improving the situation by setting the running speed of the blow-off valve in highly asymmetrical fashion.

The blow-off valve is allowed to open very rapidly when the anti-pumping controller comes into action, and subsequently to close very slowly. Upon moving in the closing direction, however, the controller then outruns the blow-off valve, and has already long been in the end position of "valve closed, controller out of action" when the valve is still on its way. In order to prevent any recurrence of pumping as the valve continues to close, the speed at which it closes must be made so low that when the operating point approaches the pumping limit for a second time, the controller is given enough time to come into action without appreciably over-oscillating beyond the regulation quantity and to interrupt the closure movement of the blow-off valve in good time.

However, such a solution has the disadvantage in operation that in some circumstances the blow-off valve remains open for much longer than is necessary, and that if there is a sudden and relatively long duration increase in the air requirement this requirement cannot be covered.

These disadvantages of anti-pumping regulation with proportional and reset action controllers can be eliminated with a controller having an asymmetrical feedback time constant i.e. reset time according to the present invention. It is characterized by means for reducing the time-constant of the feedback when regulating in one direction to a fraction of the feedback time-constant when regulating in the other direction.

The invention as applied to compressor regulation will be explained hereinafter by way of example with reference to the accompanying drawings, wherein.

Figure 1:
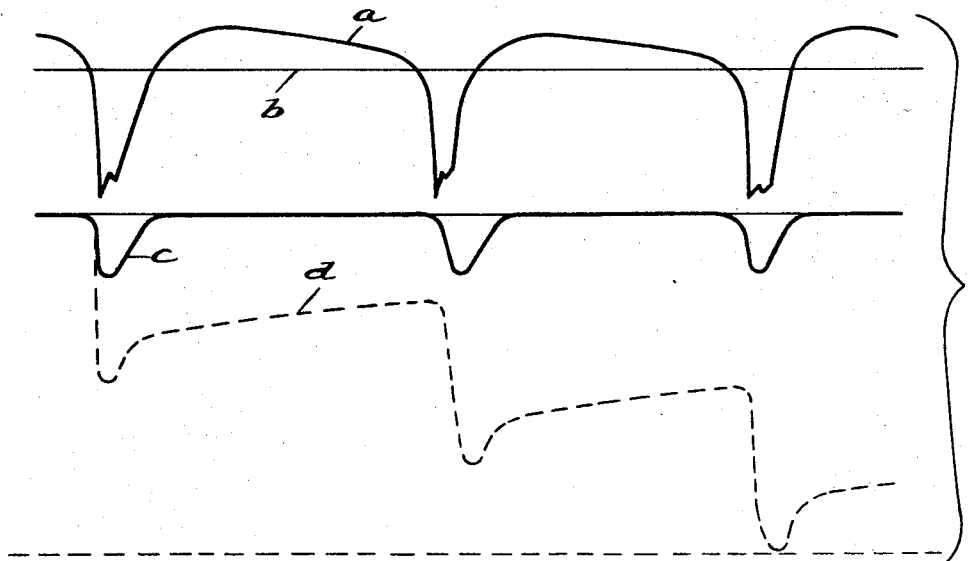
FIG. 1 shows the variation of volume (a) with time while a compressor is pumping, (b) being the set point, (c) the output quantity of a normal proportional and reset controller, and (d) that of a controller according to the invention.

With reference now to the drawings, FIG. 1 shows, for example, how a recorded volume-flow a of a compressor varies as a function of time while pumping is taking place. Since the times during which the delivered quantity drops below the critical limit (corresponding to the required value of the anti-pumping controller according to the straight line b) are relatively short, a controller which integrates the offset from set point with time will always run back into the end position of "closure of blow-off valve," as shown by curve C, in the relatively long intermediate periods during which a sufficient quantity is being delivered. The next pumping impulse takes place as soon as the blow-off valve has closed sufficiently, and the delivered volume has dropped below a critical value.

Curve c in FIG. 1 shows the variation in the output quantity of a conventional controller, and curve d that of a controller according to the invention. It is apparent from this that a controller with an asymmetrical time-constant of feedback, i.e. reset time is capable of reliably bringing a compressor back out of the pumping region, even if the response limit of the controller is located immediately at the pumping limit.

Figure 2:
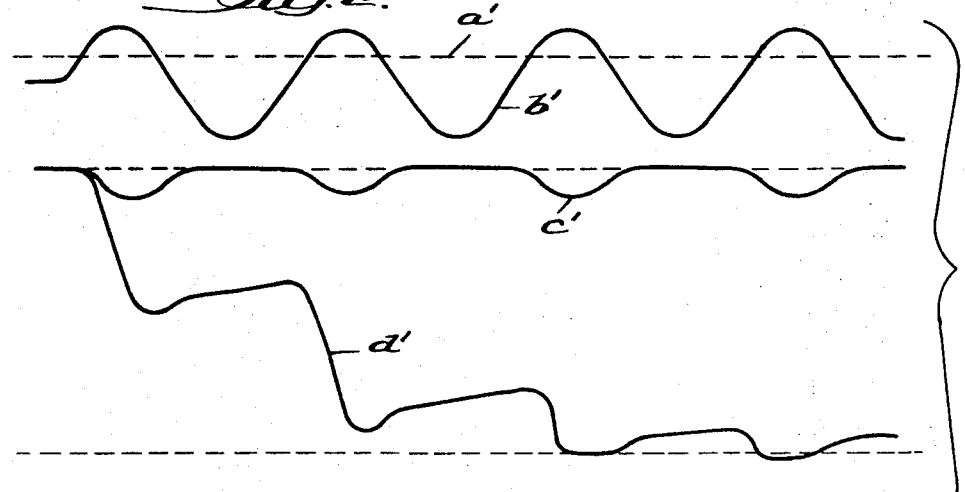
FIG. 2 shows a sinusoidally controlled actual-value curve (b') with the set point curve (a') and variation in output quantity for a known regulator (c') and the embodiment according to the invention (d').

If a controller constructed in the spirit of the invention is fed, for example, with a sinusoidal oscillation $b'$ as shown in FIG. 2 at the actual-value input, the controller output then varies in a sawtooth-like curve $d'$ towards an end position, and this is the case even if the actual value $b'$ exceeds the set point on curve $a'$ only briefly upon each oscillation, as indicated in FIG. 2.

On the contrary, curve $c'$ shows the variation in the output quantity with the same input oscillation with a conventional controller with a symmetrical feedback time-constant.

Figure 3:
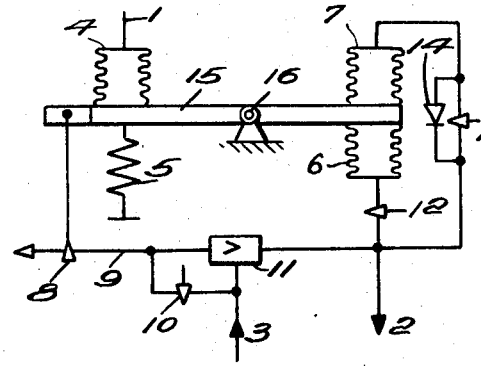
FIG. 3 shows a diagrammatic illustration of a proportional and reset action controller with, for example, pneumatic auxiliary energy in the sense of the invention.

FIG. 3 shows in diagrammatic fashion a controller with pneumatic auxiliary energy. The input connection 1 for the regulating quantity, the controller output 2 leading to the blow-off valve operating mechanism and the compressed-air feed 3 for the pilot-pressure system may be seen. The controller is embodied in known manner on the principle of a balance beam 15, on which an actual-value bellows 4 and a set point spring 5 act on one side of the pivot point 16, while feedback bellows 6 and 7 are arranged on the other side. A control valve 8, for example, a rebound plate with a nozzle, increases the outflow cross-section of the pilot-pressure air system 9 fed via a throttle 10 when the pressure in the bellows 4 increases, and thus reduces the pressure in this system 9. A pneumatic amplifier relay 11 controls the pressure at the controller output with a given amplification factor as a function of the pilot pressure in the system 9.

The output pressure of the controller 2 also acts via throttles 12 and 13 on the feedback bellows 6 and 7. With respect to the feedback arrangement, bellows 7 provides the so-called "reset action," the throttling device 12 to bellows 6 from the output provides the "rate control action," and the "proportional control action" is established by the bellows 6 working through balance beam 15 to the set-point bellows 4 which receives the actual value of the input control signal. Throttle 13 in the line between the output and bellows 7 provides the means for setting the time constant of the feedback. In accordance with the invention, a non-return valve 14 is connected in parallel with the throttle 13 and thus constitutes an asymmetrical by-pass for this throttle. With increasing output pressure, the compressed air flows via the throttle 13 to the bellows 7, and with decreasing pressure via the non-return valve 14 from the bellows 7 to the controller output 2 thus effectively by-passing the throttle 13. Thus, with increasing regulator input pressure and decreasing output pressure, the feedback time-constant, i.e. the reset time, becomes very small, for example, a few tenths of a second, while with decreasing input pressure the time-constant corresponds to the value set up at the throttle 13.

Figure 4:
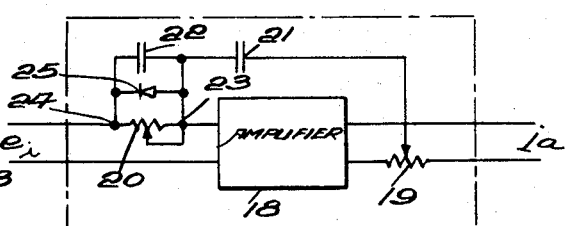
FIG. 4 illustrates the invention as applied to a controller of the electrical type having proportional and reset action.

An electrical controller with proportional and reset action embodying the invention is illustrated in FIG. 4. Here it will be seen that the input signal voltage is designated by $e_i$, and $i_a$ in the setting amplitude furnished by the controller in the form of an output current. 18 designates an amplifier of convention design and having a high input impedance. The feedback network between the output and input sides of amplifier 18 includes potentiometers 19 and 20 at the output and input sides respectively of the amplifier, and capacitors 21, 22. Capacitor 21 is connected from the tap on potentiometer 19 to a junction point 23 with one end of potentiometer 20. Capacitor 22 is connected across the ends of potentiometer 20, i.e. at junctions 23 and 24. In accordance with the invention, an asymmetrical conducting component e.g. a rectifier 25 is connected in parallel with potentiometer 20. The improved controller circuit operates in the following manner. Assuming that voltage $e_i$ is proportional to the offset from the set point, in other words that $e_i$ is, for example, the output voltage of a bridge circuit where the offset signal is being compared with the set point signal. If the offset from set point zeros, $e_i$ also is equal to zero. The amplifier 18 will supply at very high amplification an output current which is proportional to the input signal up to saturation. In case of a steady state of equilibrium, the voltage across condenser 22 will be zero because this condenser, when charged, will discharge through potentiometer 20. There will be no current flow within potentiometer 20, and the voltage at junction 23 is then equal to the voltage at junction 24, in other words $=e_i$.

Any deviation of the voltage $e_i$ from the state of equilibrium will generate through amplifier 18 a change in the output current. At the tap on potentiometer 19 there will then occur a proportional change in voltage which is reflected back to junction 23 via the feedback circuit through capacitor 21 in such manner that the change in voltage at junction 23 will counteract the change in input signal voltage. At the potentiometer 19 the intensity of the feedback signal is adjustable, i.e. the proportional range.

This change in voltage exists in the form of a charging voltage also at capacitor 22 which, however, will discharge gradually through potentiometer 20, thereby reducing to zero the feedback potential according to the time constant (reset time) as adjusted at the potentiometer.

In accordance with the invention, the asymmetrical conducting component, i.e. rectifier 25 connected electrically in parallel with potentiometer 20 and capacitor 22, permits capacitor 22 to discharge more rapidly in one direction than in the other. That is, the reset time as adjusted at the potentiometer is effective for a change in one direction only of the input signal.

I claim:

1. In a controller for controlling a device in industrial applications, the combination comprising means responsive to an input control signal for producing an amplified output signal, feedback means including first means responsive to said output signal for obtaining reset action, second means responsive to said output signal for obtaining rate control action, and third means responsive to said output signal for obtaining proportional control action, means for setting the time constant of said first means by which reset action is obtained, means establishing a by-pass for said time constant setting means, and means rendering said by-pass effective for only one sense of the variation in said output signal thereby to effect an asymmetrical characteristic for said time constant for opposite senses of the variation in said output signal.

2. A controller as defined in claim 1 which operates on electrical principles, wherein said means for setting said feedback time constant for reset action is constituted by an impedance element through which flows a current determinative of the feedback time constant, and wherein said by-pass is constituted by an asymmetrical current valve connected in parallel with said electrical impedance element, said current valve having a blocking action in one direction of current flow through said electrical impedance element and having a by-passing action for the other direction of current flow.

3. A controller as defined in claim 1 which operates on electrical principles, wherein said control signal is applied to an input circuit having a first potentiometer, an amplifier receiving said control signal from said input circuit, wherein said output signal emanates from a circuit from said amplifier having a second potentiometer, wherein said feedback means is constituted by a circuit extending from a tap on said second potentiometer through capacitor means to said control signal input circuit, and wherein said by-passing is constituted by an asymmetrical valve connected in parallel with said first potentiometer.

4. A controller as defined in claim 1 which operates on fluid pressure principles and which includes a pivoted balance beam, a first fluid pressure actuated device responsive to said input control signal and acting upon said beam to one side of the pivot axis thereof and in opposition to a preset pressure, wherein said amplified output signal is constituted by the pressure in an output fluid pressure line the pressure in which is regulated in accordance with the variation in the pressure in said first fluid pressure actuated device, wherein said means for setting the time constant of said first means by which reset action is obtained and said second means for obtaining rate control action include second and third fluid actuated devices respectively acting in opposite directions on said beam at the other side of the pivot axis thereof and throttling devices in fluid pressure lines leading to said second and third fluid pressure actuated devices from said fluid output pressure line, and wherein said by-pass for said time constant setting means is constituted by a non-return valve connected in parallel with said throttling device in the pressure line leading to said second fluid pressure actuated device.

References Cited

UNITED STATES PATENTS

| 2,285,540 | 6/1942 | Stein. | |
|---|---|---|---|
| 3,209,266 | 9/1965 | White | 307—229 X |
| 3,260,957 | 6/1966 | Kaiser et al. | 328—175 X |

ALAN COHAN, Primary Examiner

U.S. Cl. X.R.

328—69, 175